UNITED STATES PATENT OFFICE.

EMIL ELSAESSER, OF BARMEN, GERMANY, ASSIGNOR TO DAHL & CO., OF SAME PLACE.

PROCESS OF MAKING PARATOLUIDINE SULPHO-ACID.

SPECIFICATION forming part of Letters Patent No. 415,359, dated November 19, 1889.

Application filed September 3, 1888. Serial No. 284,433. (No specimens.)

*To all whom it may concern:*

Be it known that I, EMIL ELSAESSER, a subject of the Emperor of Germany, and resident at Barmen, Germany, have invented new and useful Improvements in the Manufacture of Dye-Stuffs, of which the following is a specification.

My invention relates to a yellow dye-stuff or coloring-matter which is a sulpho-acid (or an alkaline salt thereof) of a sulphureted derivative of paratoluidine.

The improvement consists in the process hereinafter described and claimed of obtaining this dye-stuff.

If a mixture of about two hundred parts, by weight, of paratoluidine with about one hundred and twenty parts, by weight, of sulphur be melted and then heated first for twenty-four hours to about 190°, (centesimal,) and afterward for twelve hours to about 250°, (centesimal,) a crude dithioparatoluidine, consisting of a mixture of various sulphureted derivatives of paratoluidine, will be obtained. In order to separate the principal constituents of the product thus obtained, use is made of their different degrees of solubility in strong alcohol.

The melted matter resulting from the above process is ground as finely as possible, and the powder is extracted in a suitable extracting apparatus with five times its weight of boiling strong alcohol. The soluble extract thus obtained, which contains in the average about thirty per cent. of the solid constituents of the melted matter, is then separated from the insoluble residue by filtering or by other mechanical means. The said residue, which hereinafter shall be termed "thioparatoluidine," has in its dry state the appearance of a bright-yellow powder, which dissolves with an orange color in concentrated hydrochloric acid, and is again precipitated by the addition of water. It is a body different from the hitherto-known thioparatoluidines, which are colorless substances. This new thioparatoluidine is now capable of being readily converted into a sulpho-acid. For this purpose it is introduced, while stirring and at a temperature not exceeding 40°, (centesimal,) into about four times its weight of fuming sulphuric acid containing from twenty to thirty per cent. of sulphuric anhydride. After the introduction is complete the temperature is maintained at from 40° to 50° (centesimal) until a sample of the acid mixture or solution, upon its being precipitated with water, yields a matter which, after being well washed with water, completely dissolves upon the addition of soda. This point being arrived at, the entire acid mixture is poured into ice-water, stirred, and filtered through a filter-press, and the insoluble sulpho-acid thus collected on the filter is thoroughly freed from any excess of sulphuric acid by washing with water. The sulpho-acid of thioparatoluidine thus obtained is then converted into a sodium salt by means of a solution of soda. The solution is filtered and evaporated to dryness.

The sodium salt of the sulpho-acid of thioparatoluidine possesses the property of dyeing an intense yellow color upon cotton yarns which are suspended in its aqueous solution to which common salt has been previously added. If such dyed yarns are afterward placed into a cold solution of nitrite of soda acidulated with sulphuric acid, the yellow dye-stuff fixed upon the fiber is diazotized, and thereby rendered capable of being changed into azo colors upon a subsequent treatment with naphthols or with sulpho-acids of the same, with naphthylamines or with the corresponding sulpho-acids, with phenol, resorcin, metaphenylene and toluylene diamines. The said azo colors will then impart to the fiber very fast red, orange, yellow, or brown colors.

I do not claim, broadly, in the manufacture of dye-stuffs, converting a paratoluidine base containing sulphur into a sulpho-acid by means of a sulphurizing process, such a conversion being described in British patent of Johnson, No. 6,319, A. D. 1888; but

What I claim as my invention is—

The improvement in the process of producing yellow dye-stuffs from paratoluidine, consisting in first subjecting crude dithioparatoluidine to the action of alcohol for the purpose of extracting the parts which are soluble therein, next filtering or separating the residuum, and afterward converting said residuum into a sulpho-acid by agitating it with fuming sulphuric acid containing sulphuric anhydride, all substantially as herein set forth.

In testimony whereof I have signed my name to this specification in the presence of two subscribing witnesses.

EMIL ELSAESSER.

Witnesses:
CARL KRÜGER,
ARTHUR KAYER.